US012627855B2

(12) United States Patent     (10) Patent No.:     US 12,627,855 B2
Chen et al.                          (45) Date of Patent:         May 12, 2026

(54) CHANNEL PREDICTION METHOD APPLIED TO CHANNEL CHANGE AND ASSOCIATED ELECTRONIC DEVICE

(71) Applicant: Realtek Semiconductor Corp., HsinChu (TW)

(72) Inventors: Chun-Yi Chen, HsinChu (TW); Chung-Hsien Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 104 days.

(21) Appl. No.: 18/735,234

(22) Filed: Jun. 6, 2024

(65)           Prior Publication Data

US 2024/0422384 A1     Dec. 19, 2024

(30)      Foreign Application Priority Data

Jun. 16, 2023    (TW) ................................. 112122627

(51) Int. Cl.
H04N 21/438        (2011.01)
H04N 21/466        (2011.01)
(52) U.S. Cl.
CPC ..... H04N 21/4384 (2013.01); H04N 21/4663 (2013.01)
(58) Field of Classification Search
CPC ........... H04N 21/4384; H04N 21/4663; H04N 21/4383
See application file for complete search history.

(56)            References Cited

U.S. PATENT DOCUMENTS

| | | | | |
|---|---|---|---|---|
| 6,112,186 A | * | 8/2000 | Bergh | G06Q 30/02 |
| | | | | 705/14.66 |
| 7,117,518 B1 | * | 10/2006 | Takahashi | H04N 21/44222 |
| | | | | 725/86 |
| 7,430,360 B2 | * | 9/2008 | Abecassis | H04N 7/17318 |
| | | | | 348/E7.071 |
| 8,010,978 B2 | * | 8/2011 | Park | H04N 21/812 |
| | | | | 725/35 |
| 8,074,882 B2 | * | 12/2011 | Dmitriev | H04N 21/25435 |
| | | | | 235/383 |
| 8,176,510 B2 | * | 5/2012 | Craner | H04N 21/478 |
| | | | | 725/39 |
| 2007/0124756 A1 | * | 5/2007 | Covell | G06F 16/635 |
| | | | | 348/E7.071 |
| 2008/0155614 A1 | * | 6/2008 | Cooper | H04N 21/23106 |
| | | | | 705/26.1 |
| 2009/0034426 A1 | * | 2/2009 | Luft | H04N 21/2407 |
| | | | | 370/252 |
| 2009/0164655 A1 | * | 6/2009 | Pettersson | H04L 65/65 |
| | | | | 709/231 |

(Continued)

*Primary Examiner* — Michael B. Pierorazio
(74) *Attorney, Agent, or Firm* — Winston Hsu

(57)            ABSTRACT

A channel prediction method applied to channel change includes: selecting multiple candidate prediction channels from multiple channels in a channel database, and storing the multiple candidate prediction channels into a prediction database; comparing the multiple candidate prediction channels with a channel selected by a user to generate a comparison result; and selecting multiple prediction channels from the multiple candidate prediction channels in the prediction database according to the comparison result, and storing the multiple prediction channels into a channel buffer.

18 Claims, 8 Drawing Sheets

(56)                    References Cited

U.S. PATENT DOCUMENTS

| | | | |
|---|---|---|---|
| 2009/0172757 A1* | 7/2009 | Aldrey | H04N 7/173 |
| | | | 725/110 |
| 2010/0122293 A1* | 5/2010 | Craner | H04N 21/812 |
| | | | 725/40 |
| 2010/0131385 A1* | 5/2010 | Harrang | G06Q 30/0631 |
| | | | 705/26.1 |
| 2010/0250672 A1* | 9/2010 | Vance | G06Q 10/109 |
| | | | 709/204 |
| 2011/0154385 A1* | 6/2011 | Price | G10L 17/00 |
| | | | 725/12 |
| 2011/0283189 A1* | 11/2011 | McCarty | H04N 21/4532 |
| | | | 715/810 |
| 2012/0059845 A1* | 3/2012 | Covell | H04N 21/4394 |
| | | | 707/769 |
| 2014/0137176 A1* | 5/2014 | Gaillard | H04N 21/6193 |
| | | | 725/116 |
| 2019/0174188 A1* | 6/2019 | Li | H04N 21/44213 |
| 2021/0185381 A1* | 6/2021 | Clift | H04N 21/2187 |
| 2021/0185391 A1 | 6/2021 | Chamberlin | |
| 2021/0385525 A1 | 12/2021 | Chen | |

* cited by examiner

| CPCH | 1 | 2 | 3 | 4 | 5 | 6 | 7 | 8 | 9 | 10 |
|---|---|---|---|---|---|---|---|---|---|---|
| R1 | 75% | 50% | 50% | | | | | | | |
| R2 | 37.5% | 25% | 25% | | 25% | | | | | |
| R3 | 25% | 16.7% | 16.7% | 25% | 50% | 50% | | | | |
| R4 | 18% | 12.5% | 12.5% | 12.5% | 75% | 50% | 25% | | | |

| CPCH | CB | Factor | Prediction probability | Channel changed to/watched by user | Updated CB | Updated prediction probability |
|---|---|---|---|---|---|---|
| R1(initialization phase) | | | | | | |
| 1 | 1 | ABC | 75% | CH2 | | |
| 2 | 2 | AB | 50% | | | |
| 3 | 3 | BC | 50% | | | |
| R2(less than 1 minute) | | | | | | |
| 1 | 1 | | 75% | CH5 | 1 | 37.5% |
| 2 | 2 | | 50% | | 2 | 25% |
| 3 | 3 | | 50% | | | 25% |
| 5 | 5 | C | 25% | | 5 | 25% |
| R3(less than 1 minute) | | | | | | |
| 4 | 1 | C | 25% | CH6 | 4 | 25% |
| 5 | 2 | AB | 50% | | 5 | 50% |
| 6 | 5 | BC | 50% | | 6 | 50% |
| R4(greater than 10 minutes) | | | | | | |
| 5 | 4 | ABC | 75% | CH7 | 5 | 75% |
| 6 | 5 | AB | 50% | | 6 | 50% |
| 7 | 6 | C | 25% | | 7 | 25% |

FIG. 7

| CPCH | 1 | 2 | 3 | 4 | 5 | 6 | 7 | 8 | 9 | 10 |
|---|---|---|---|---|---|---|---|---|---|---|
| R5 | 15% | 10% | 10% | 8.3% | 37.5% | 50% | 75% | 50% | | |
| R6 | 12.5% | 8.3% | 8.3% | 6.25% | 25% | 25% | 75% | 62.5% | 25% | |
| R7 | 10.7% | 7.14% | 25% | 5% | 18.8% | 12.5% | 37.5% | 31.25% | 50% | 50% |

| CPCH | CB | Factor | Prediction probability | Channel changed to/ watched by user | Updated CB | Updated prediction probability |
|---|---|---|---|---|---|---|
| R5(> 5 minutes and ≤ 10 minutes) | | | | | | |
| 6 | 5 | BC | 50% | CH8 | 6 | 50% |
| 7 | 6 | ABD | 75% | | 7 | 75% |
| 8 | 7 | AC | 50% | | 8 | 50% |
| R6(less than 1 minute) | | | | | | |
| 7 | 6 | ABC | 75% | CH9 | 7 | 75% |
| 8 | 7 | ABD | 62.5% | | 8 | 62.5% |
| 9 | 8 | C | 25% | | 9 | 25% |
| R7(Power off) | | | | | | |
| 9 | 7 | AB | 50% | CH3 | 9 | 50% |
| 10 | 8 | AC | 50% | | 10 | 50% |
| 7 | 9 | | | | 7 | 37.5% |
| 3 | | C | 25% | | | 25% |

FIG. 8

CHANNEL PREDICTION METHOD APPLIED TO CHANNEL CHANGE AND ASSOCIATED ELECTRONIC DEVICE

BACKGROUND OF THE INVENTION

1. Field of the Invention

The present invention is related to channel change, and more particularly, to a channel prediction method applied to fast channel change (FCC) and an associated electronic device.

2. Description of the Prior Art

When a user performs FCC to change from one channel to another, program content of the other channel will be loaded into a memory only after the channel change, which may cause delays resulting in a poor user experience. A channel prediction method applied to the FCC, which can predict a next channel to which a user desires to change and pre-load program content of the predicted channel into the memory to speed up the FCC, is therefore urgently needed.

SUMMARY OF THE INVENTION

It is therefore one of the objectives of the present invention to provide a channel prediction method applied to channel change, and an associated electronic device, to address the above-mentioned issues.

According to an embodiment of the present invention, a channel prediction method applied to channel change is provided. The channel prediction method comprises: selecting multiple candidate prediction channels from multiple channels in a channel database, and storing the multiple candidate prediction channels into a prediction database; comparing the multiple candidate prediction channels with a channel selected by a user to generate a comparison result; and selecting multiple prediction channels from the multiple candidate prediction channels in the prediction database according to the comparison result, and storing the multiple prediction channels into a channel buffer.

According to an embodiment of the present invention, an electronic device applied to channel change is provided. The electronic device comprises a processor. The processor is arranged to: select multiple candidate prediction channels from multiple channels in a channel database, and store the multiple candidate prediction channels into a prediction database; compare the multiple candidate prediction channels with a channel selected by a user to generate a comparison result; and select multiple prediction channels from the multiple candidate prediction channels in the prediction database according to the comparison result, and store the multiple prediction channels into a channel buffer.

One of the benefits of the channel prediction method and associated electronic device of the present invention is that a next channel to which a user desires to change (e.g., a prediction channel) can be predicted, and program content of the prediction channel can thereby be loaded in a memory in advance according to prediction channels in a channel buffer. In this way, the FCC can be sped up and the user experience can be greatly improved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram illustrating an example of the channel prediction method shown in FIG. 2 according to an embodiment of the present invention.

FIG. 8 is a diagram illustrating another example of the channel prediction method shown in FIG. 2 according to an embodiment of the present invention.

DETAILED DESCRIPTION

Figure 1:
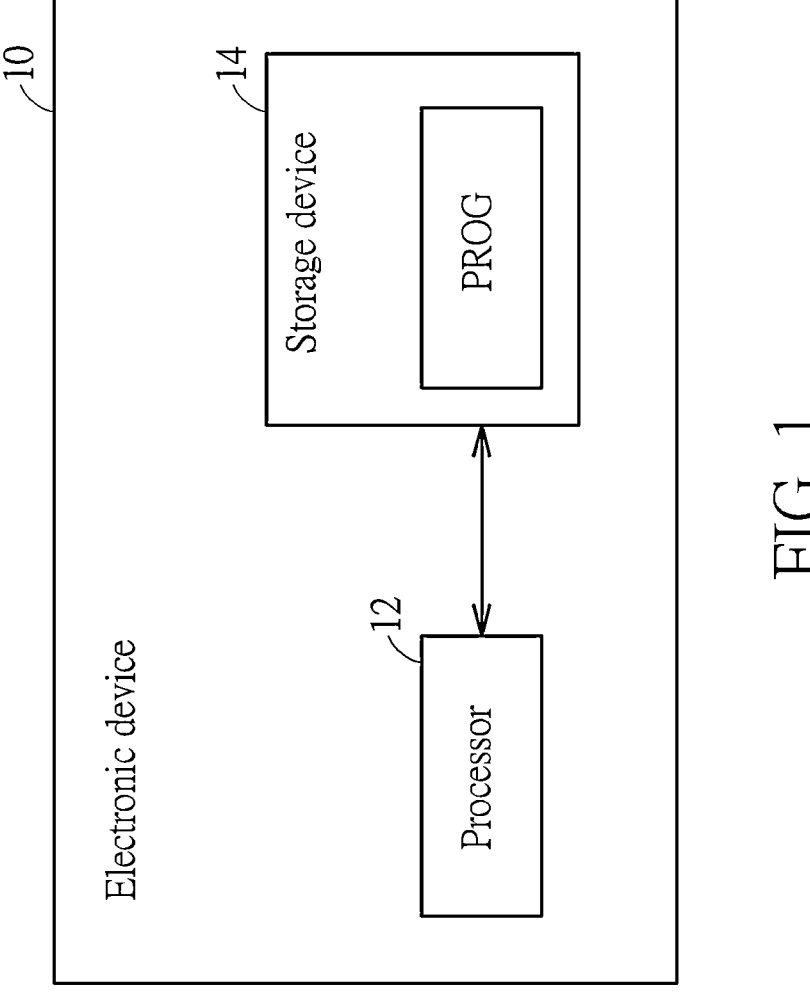
FIG. 1 is a diagram illustrating an electronic device according to an embodiment of the present invention.

FIG. 1 is a diagram illustrating an electronic device 10 according to an embodiment of the present invention. Examples of the electronic device 10 may be, but are not limited to: a television (TV) or a set-up box (STB). The electronic device 10 includes a processor 12 and a storage device 14. The processor 12 may be a single-core processor or a multi-core processor, and is equipped with software execution ability. The storage device 14 is arranged to store a program code PROG, wherein the program code PROG may include a channel prediction algorithm. When loaded and executed by the processor 12, the program code PROG instructs the processor 12 to perform a channel prediction method proposed by the present invention to predict a next channel changed to by a user. The electronic device 10 may be regarded as a computer system using a computer program product that includes a computer-readable medium containing the program code PROG, such that the channel prediction method proposed by the present invention can be embodied on the electronic device 10.

Figure 2:
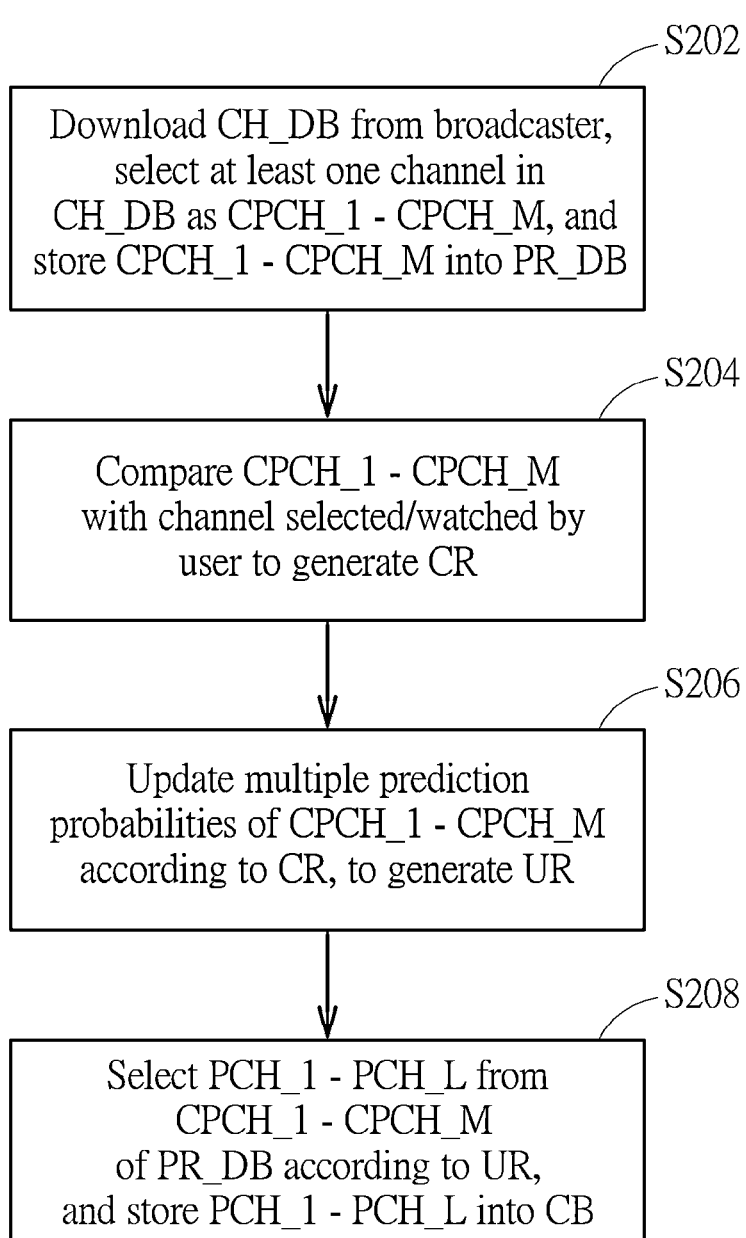
FIG. 2 is a flow chart of a channel prediction method according to an embodiment of the present invention.

FIG. 2 is a flow chart of a channel prediction method according to an embodiment of the present invention. Provided that the result is substantially the same, the steps are not required to be executed in the exact order shown in FIG. 2. For example, the channel prediction method shown in FIG. 2 may be employed by the processor 12 shown in FIG. 1 that executes the channel prediction algorithm.

The processor 12 may download a channel database CH_DB (e.g., a channel list) from a broadcaster through a network or an antenna, wherein the channel database CH_DB may include multiple channels CH_1-CH_N, and N is a positive integer greater than one. The processor 12 may select at least one channel (e.g., one or more channels) from the channel database CH_DB as multiple candidate prediction channels CPCH_1-CPCH_M, and store the candidate prediction channels CPCH_1 CPCH_M into a prediction database PR_DB for subsequent processing (Step S202), wherein M is a positive integer greater than one, and the number of the candidate prediction channels CPCH_1-CPCH_M can be adjusted depending upon the actual design requirements. Each of the candidate prediction channels CPCH_1-CPCH_M has its own prediction probability, and a predetermined prediction probability of each candidate prediction channel is 0%. The processor 12 may compare the candidate prediction channels CPCH_1-CPCH_M with a channel selected/watched by the user to generate a comparison result CR (Step S204), and update multiple prediction probabilities of the candidate prediction channels CPCH_1-CPCH_M to generate an updated result UR (Step S206), wherein the updated result UR may indicate multiple updated prediction probabilities of the candidate prediction channels CPCH_1-CPCH_M.

In detail, the prediction probability may be composed of 4 factors (e.g., factors A, B, C, and D), but the present invention is not limited thereto. The number and type of factors can be adjusted depending upon the actual design requirements. In this embodiment, each of the 4 factors separately accounts for 25% of the predicted probability. For the factor A, in response to the comparison result CR indicating that a program type of a candidate prediction channel among the candidate prediction channels CPCH_1-CPCH_M is the same as that of the channel selected/watched by the user, a prediction probability of the candidate prediction channel can be increased (e.g., increased by 25%). For the factor B, in response to a candidate prediction channel among the candidate prediction channels CPCH_1-CPCH_M being within a channel buffer CB, a prediction probability of the candidate prediction channel can be increased (e.g., increased by 25%). For the factor C, in response to the user change from the channel selected/watched by the user to a candidate prediction channel among the candidate prediction channels CPCH_1-CPCH_M by pressing an up button, a down button, a number button, or a return button on a remote controller (e.g., a remote controller of the electronic device 10, such as a remote controller of the TV or the STB), a prediction probability of the candidate prediction channel can be increased (e.g., increased by 25%). For the factor D, in response to a residence time (e.g., a user watching time) of a candidate prediction channel among the candidate prediction channels CPCH_1-CPCH_M being less than or equal to a predetermined time, a prediction probability of the candidate prediction channel is not changed. In response to the residence time of the candidate prediction channel being greater than the predetermined time, the prediction probability of the candidate prediction channel is increased. For example, the predetermined time may be 5 minutes, and another predetermined time (e.g., 10 minutes) can be set. When the user watching time of the candidate prediction channel is less than or equal to 5 minutes, the prediction probability of the candidate prediction channel is not changed. When the user watching time of the candidate prediction channel is greater than 5 minutes and less than or equal to 10 minutes, the prediction probability of the candidate prediction channel is increased by 12.5%. When the user watching time of the candidate prediction channel is greater than 10 minutes, the prediction probability of the candidate prediction channel is increased by 25%.

It should be noted that the prediction database PR_DB may further include at least one prediction error channel. For a candidate prediction channel among the candidate prediction channels CPCH_1-CPCH_M, when the prediction fails (e.g., the next channel the user changes to/watches is not the candidate prediction channel), the candidate prediction channel may be regarded as a prediction error channel. Under a condition that the candidate prediction channel is regarded as the prediction error channel, the processor 12 may reduce the prediction probability of the candidate prediction channel (e.g., by multiplying the prediction probability by ½, ⅓, ¼, . . . , and so on).

In addition, the processor 12 may select multiple prediction channels PCH_1-PCH_L from the candidate prediction channels CPCH_1 CPCH_M of the prediction database PR_DB according to the updated result UR, and store the prediction channels PCH_1-PCH_L into the channel buffer CB (Step S208), wherein the number of prediction channels PCH_1-PCH_L can be determined depending upon the number of buffer slots of the channel buffer CB. For example, channel buffer CB may have 3 buffer slots for storing prediction channels PCH_1-PCH_3 (L=3), respectively. In addition, the prediction probabilities of the prediction channels PCH_1-PCH_L are greater than or equal to that of other candidate prediction channels among of the candidate prediction channels CPCH_1-CPCH_M, meaning that the user has a high probability to change from the currently selected/watched channel to the prediction channels PCH_1-PCH_L in the channel buffer CB. For the channel prediction method of the present invention, the next channel to which the user desires to change (i.e., the prediction channels PCH_1-PCH_L) can be predicted, and program contents of the prediction channels PCH_1-PCH_L in the channel buffer CB can thereby be loaded to a memory (e.g., the storage device 14 shown in FIG. 1). In this way, fast channel change (FCC) can be sped up and the user experience can be greatly improved.

Figure 3:
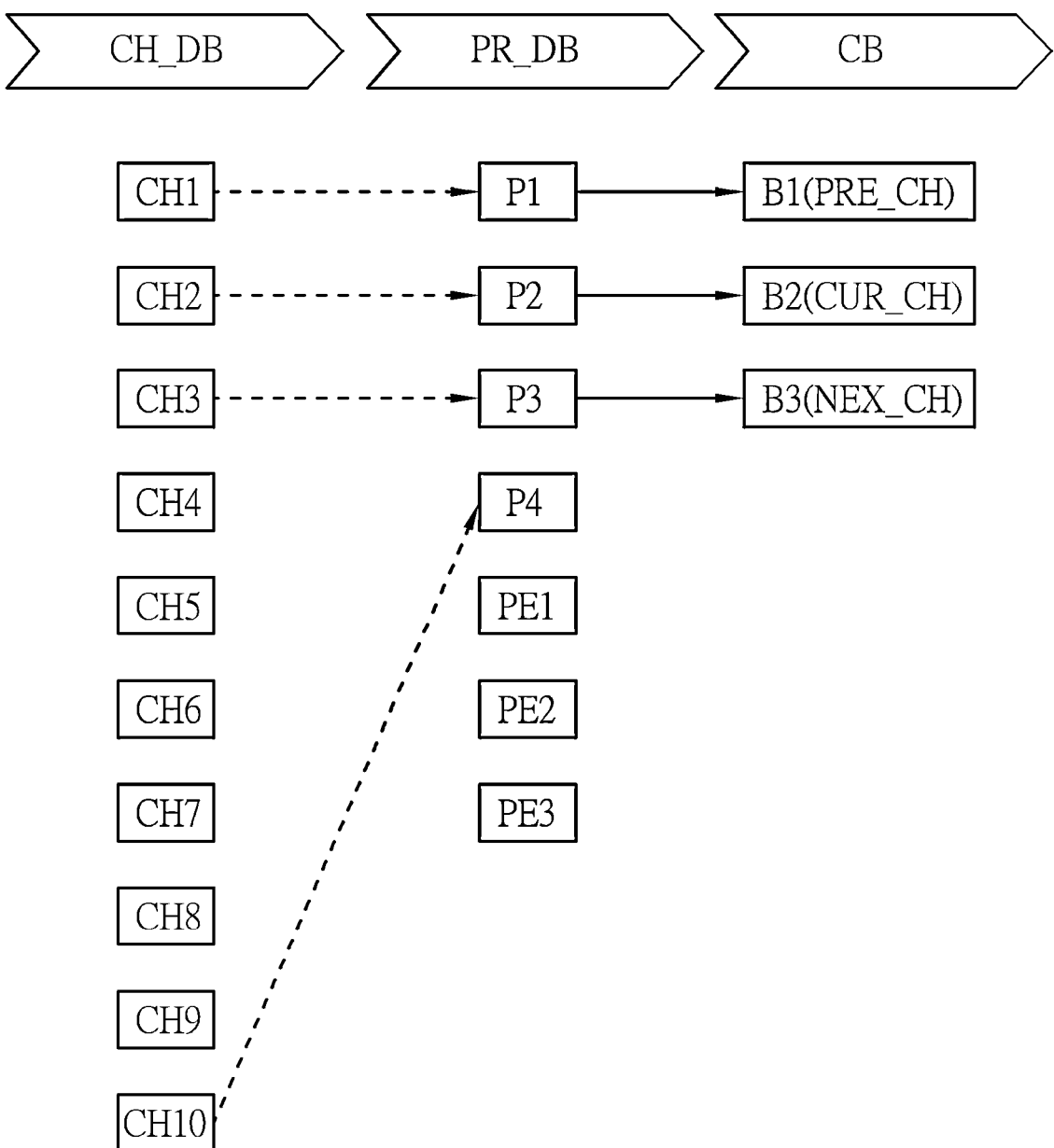
FIG. 3 is a diagram illustrating a channel control scheme between a channel database, a prediction database, and a channel buffer according to a first embodiment of the present invention.

FIG. 3 is a diagram illustrating a channel control scheme between the channel database CH_DB, the prediction database PR_DB, and the channel buffer CB according to a first embodiment of the present invention. In this embodiment, the electronic device 10 is in an initialization phase. As shown in FIG. 3, the channel database CH_DB may include 10 channels CH_1-CH_10 (i.e., N=10), and the prediction database PR_DB may include 4 candidate prediction channels CPCH_1-CPCH_4 (i.e., M=4; for brevity, the candidate prediction channels CPCH_1-CPCH_4 are labeled as P1-P4, respectively, in FIG. 3) and 3 prediction error channels PE1-PE3. In addition, the channel buffer CB may include 3 buffer slots B1-B3 for storing prediction channels PCH_1-PCH_3 (i.e., L=3). The prediction channels PCH_1-PCH_3 may include a pre-prediction channel PRE_CH, a current prediction channel CUR_CH, and a post-prediction channel NEX_CH, wherein the buffer slot B1 corresponds to the pre-prediction channel PRE_CH, the buffer slot B2 corresponds to the current prediction channel CUR_CH, the buffer slot B3 corresponds to the post-prediction channel NEX_CH, and the prediction probability of the current prediction channel CUR_CH should be the highest among prediction probabilities of these three prediction channels. In response to the electronic device 10 being in the initialization phase, the channels CH_1-CH_3 in the channel database CH_DB may be selected as multiple predetermined prediction channels (e.g., the candidate prediction channels CPCH_1-CPCH_3) and may be stored into the prediction database PR_DB, and the candidate prediction channels CPCH_1-CPCH_3 in the prediction database PR_DB may be directly stored into the channel buffer CB. For example, the candidate prediction channel CPCH_1 may be stored into the buffer slot B1 of the channel buffer CB as the pre-prediction channel PRE_CH, the candidate prediction channel CPCH_2 may be stored into the buffer slot B2 of the channel buffer CB as the current prediction channel CUR_CH, and the candidate prediction channel CPCH_3 may be stored into the buffer slot B3 of the channel buffer CB as the post-prediction channel NEX_CH. In addition, another channel (e.g., the channel CH10) in the channel database CH_DB may be selected as the candidate prediction channel CPCH_4.

Figure 4:
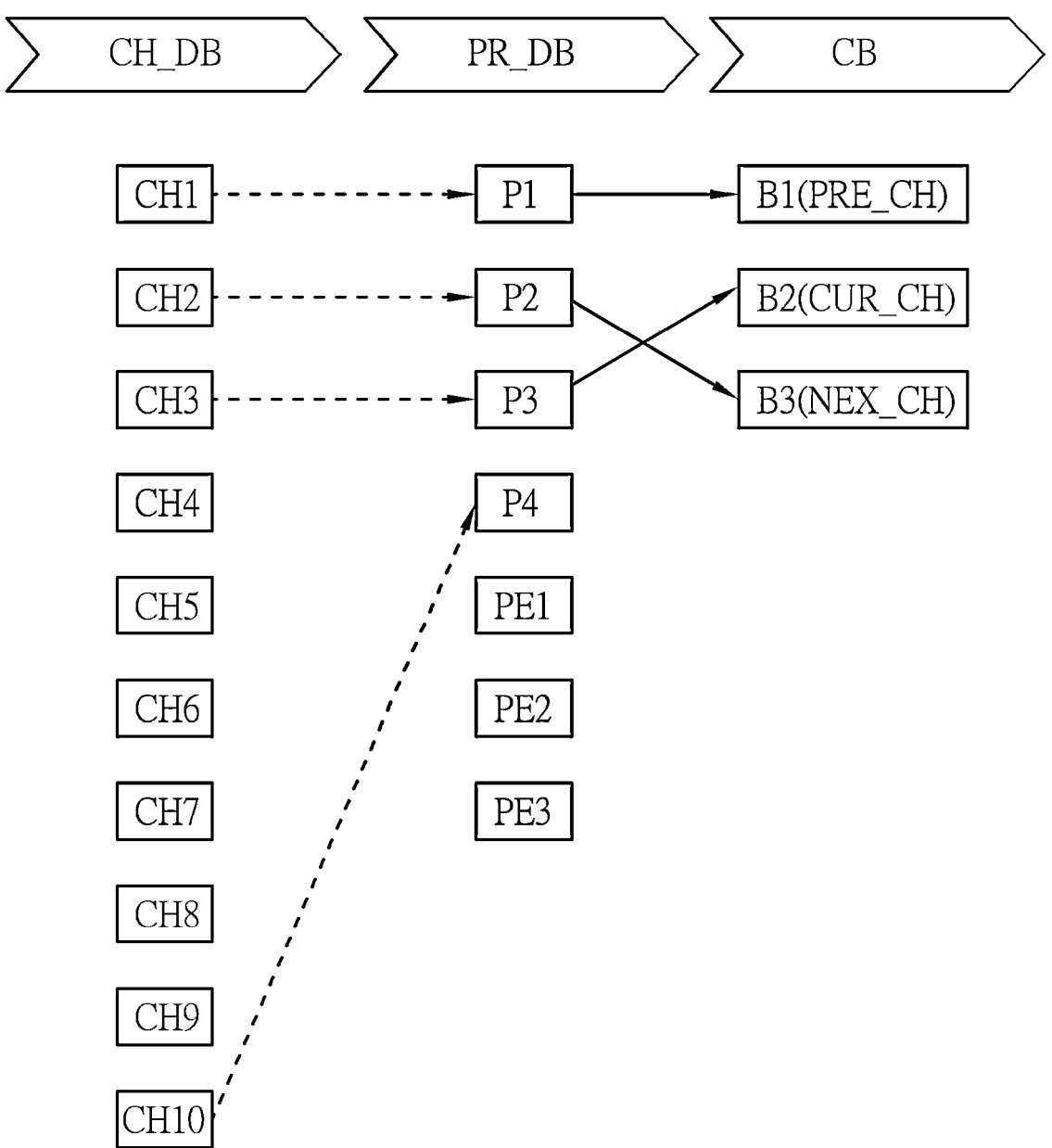
FIG. 4 is a diagram illustrating a channel control scheme between a channel database, a prediction database, and a channel buffer according to a second embodiment of the present invention.

FIG. 4 is a diagram illustrating a channel control scheme between the channel database CH_DB, the prediction database PR_DB, and the channel buffer CB according to a second embodiment of the present invention. Different from the channel control scheme shown in FIG. 3, in this embodiment, the user changes from the channel CH2 to the channel CH3 by pressing the down button on the remote controller (i.e., the channel currently selected/watched by the user is the channel CH3). Under this situation, the comparison result CR may indicate that the channel selected/watched by the user is the post-prediction channel (i.e., the candidate prediction channel CPCH_3), and the processor 12 may exchange a position of the post-prediction channel NEX_CH and a position of the current prediction channel CUR_CH in the channel buffer CB. That is, a data flow corresponding to the candidate prediction channel CPCH_2 in the prediction database PR_DB may be transmitted to the buffer slot B3 corresponding to the post-prediction channel NEX_CH in the channel buffer CB, and a data flow corresponding to the candidate prediction channel CPCH_3 in the prediction database PR_DB may be transmitted to the buffer slot B2 corresponding to the current prediction channel CUR_CH in the channel buffer CB. In some embodiments, if the user changes from the channel CH2 to the channel CH1 by pressing the up button on the remote controller, the comparison result CR may indicate that the channel selected/watched by the user is the pre-prediction channel PRE_CH (i.e., the candidate prediction channel CPCH_1), and the processor 12 may exchange a position of the pre-prediction channel PRE_CH and a position of the current prediction channel CUR_CH in the channel buffer CB. That is, a data flow corresponding to the candidate prediction channel CPCH_2 in the prediction database PR_DB may be transmitted to the buffer slot B1 corresponding to the pre-prediction channel PRE_CH in the channel buffer CB, and a data flow corresponding to the candidate prediction channel CPCH_1 in the prediction database PR_DB may be transmitted to the buffer slot B2 corresponding to the current prediction channel CUR_CH in the channel buffer CB.

Figure 5:
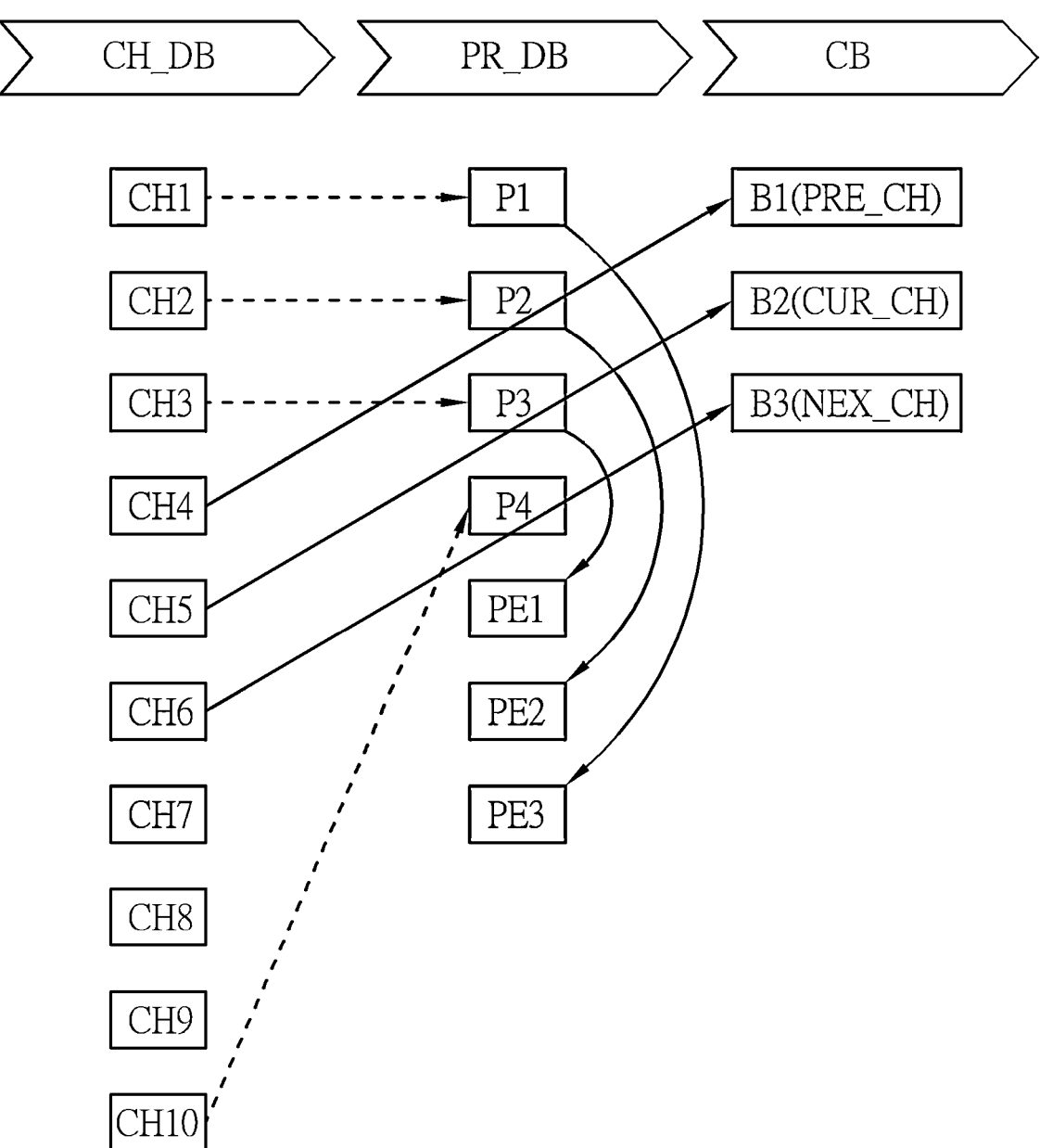
FIG. 5 is a diagram illustrating a channel control scheme between a channel database, a prediction database, and a channel buffer according to a third embodiment of the present invention.

FIG. 5 is a diagram illustrating a channel control scheme between the channel database CH_DB, the prediction database PR_DB, and the channel buffer CB according to a third embodiment of the present invention. Different from the channel control scheme shown in FIG. 3, in this embodiment, the user changes from the channel CH2 to the channel CH5 by pressing the number button on the remote controller (e.g., a number button "5" corresponding to the channel CH5), meaning that the channel currently selected/watched by the user is the channel CH5. Under this situation, the comparison result CR may indicate that the channel currently selected/watched by the user is not one of the prediction channels PCH_1-PCH_3 (i.e., the pre-prediction channel PRE_CH, the current prediction channel CUR_CH, and the post-prediction channel NEX_CH). The processor 12 may regard the candidate prediction channels CPCH_1-CPCH_3 corresponding to the prediction channels PCH_1-PCH_3 in the prediction database PR_DB as the prediction error channels PE1-PE3, and utilize the channel currently selected/watched by the user (e.g., the channel CH5), a previous channel of the channel CH5 (e.g., the channel CH4), and a next channel of the channel CH5 (e.g., the channel CH6) to, respectively, replace the current prediction channel CUR_CH, the pre-prediction channel PRE_CH, and the post-prediction channel NEX_CH in the channel buffer CB. Specifically, when the candidate prediction channels CPCH_1-CPCH_3 are regarded as the prediction error channels PE1-PE3, the processor 12 may reduce the prediction probabilities of the candidate prediction channels CPCH_1-CPCH_3, respectively (e.g., by multiplying each prediction probability by ½). It should be noted that, if the user changes to another channel and the candidate prediction channels CPCH_1-CPCH_3 are still regarded as the prediction error channels PE1-PE3, the processor 12 may continuously reduce the prediction probabilities of the candidate prediction channels CPCH_1-CPCH_3, respectively (e.g., by multiplying each prediction probability by ⅓, ¼, ⅕, . . . , and so on).

Figure 6:
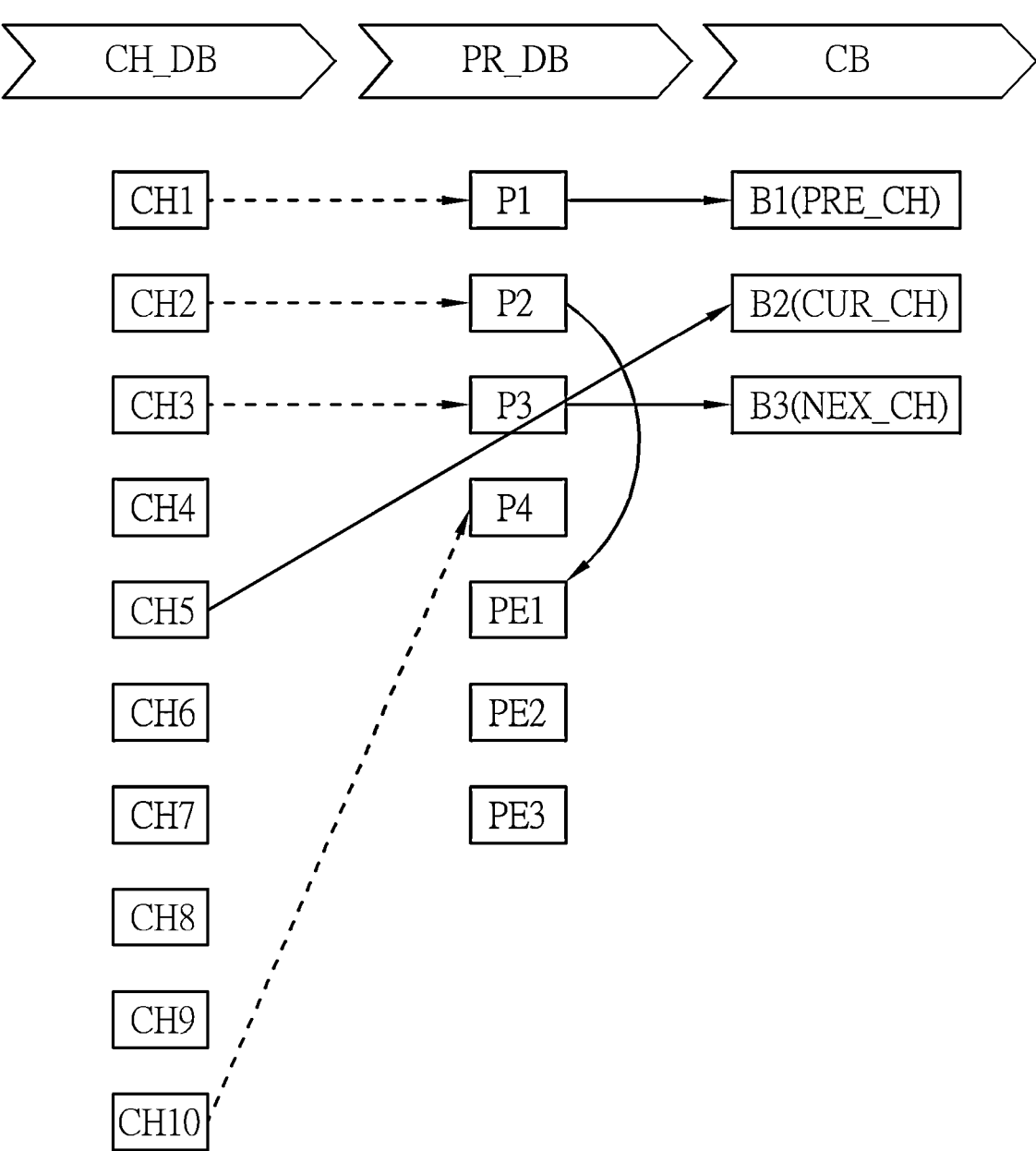
FIG. 6 is a diagram illustrating a channel control scheme between a channel database, a prediction database, and a channel buffer according to a fourth embodiment of the present invention.

FIG. 6 is a diagram illustrating a channel control scheme between the channel database CH_DB, the prediction database PR_DB, and the channel buffer CB according to a fourth embodiment of the present invention. Different from the channel control scheme shown in FIG. 3, in this embodiment, the user returns from the channel CH2 to the channel CH5 by pressing the return button on the remote controller. For example, when the previous channel the user watched is the channel CH5 and the channel currently watched is the channel CH2, the user can return from the channel CH2 to the channel CH5 by pressing the return button on the remote controller. Under this situation, the comparison result CR may indicate that the channel currently selected/watched by the user is not one of the prediction channels PCH_1-PCH_3 (i.e., the pre-prediction channel PRE_CH, the current prediction channel CUR_CH, and the post-prediction channel NEX_CH). The processor 12 may regard the candidate prediction channel CPCH_2 corresponding to the current prediction channel CUR_CH in the prediction database PR_DB as the prediction error channel PE1 in the prediction database PR_DB. Specifically, when the candidate prediction channel CPCH_2 is regarded as the prediction error channel PE1, the processor 12 may reduce the prediction probability of the candidate prediction channel CPCH_2 (e.g., multiply the prediction probability by ½). It should be noted that, if the user changes to another channel and the candidate prediction channel CPCH_2 is still regarded as the prediction error channel PE1, the processor 12 may continuously reduce the prediction probability of the candidate prediction channel CPCH_2 (e.g., by multiplying each prediction probability by ⅓, ¼, ⅕, . . . , and so on). Compared with the channel control scheme shown in FIG. 5, in the channel control scheme shown in FIG. 6, the pre-prediction channel PRE_CH is not the channel CH4 but the channel CH4, the post-prediction channel NEX_CH is not the channel CH6 but the channel CH3, and only the candidate prediction channel CPCH_2 in the prediction database PR_DB is regarded as the prediction error channel PE1 in the prediction database PR_DB.

TABLE 1

| Channel | Program type | Buffer slot | User habit | Residence time (minutes) |
|---|---|---|---|---|
| CH1 | Sport | B1 | Down button | 1 |
| CH2 | Sport | B2 | Up button | 6 |
| CH3 | Cartoon | B3 | Down button | 0 |
| CH4 | Cartoon | B1 | Up button | 0 |
| CH5 | News | B2 | Down button | 1 |
| CH6 | News | B3 | Up button | 10 |
| CH7 | Animal | B1 | Return button or | 60 |

TABLE 1-continued

| Channel | Program type | Buffer slot | User habit | Residence time (minutes) |
|---------|--------------|-------------|------------|--------------------------|
| | | | number button | |
| CH8 | Animal | B2 | Down button | 40 |
| CH9 | Drama | B3 | Up button | 1 |
| CH10 | Drama | B1 | Return button or number button | 5 |

Table 1 illustrates an example of the channel database CH_DB after the channel prediction method of the present invention is performed, wherein the channel database CH_DB includes 10 channels (e.g., the channels CH1-CH10), the program type of the channel CH1 is the same as that of the channel CH2, the program type of the channel CH3 is the same as that of the channel CH4, the program type of the channel CH5 is the same as that of the channel CH6, the program type of the channel CH7 is the same as that of the channel CH8, and the program type of the channel CH9 is the same as that of the channel CH10. It should be noted that an original channel database CH_DB downloaded from the broadcaster by the processor 12 only has the first two fields in the table 1 (i.e., a channel field and a corresponding program type field), and the last three fields in the table 1 (e.g., a buffer slot field, a user habit field, and a residence time field) are results calculated by the processor 12 through the channel prediction algorithm each time the user changes channels. The processor 12 may continuously update the results to the channel database CH_DB. For example, the buffer slot field may represent buffer slots where the user changes from the channel CH1 to the CH10 in sequence. The user habit field may represent the most likely behavior the user will perform next after watching the channel, which is calculated and counted by the channel prediction algorithm. The residence time field may represent the residence time during which the user watches/changes to the channel.

FIG. 7 is a diagram illustrating an example of the channel prediction method shown in FIG. 2 according to an embodiment of the present invention, wherein the channel database CH_DB includes 10 channels (e.g., the channels CH1-CH10), and the program type of each channel may be known by referring to the above-mentioned table 1. In this embodiment, when the user changes channels, a next round will be entered, and the channel prediction algorithm will be executed to calculate the prediction probabilities of the candidate prediction channels in each round. For a first round R1, assume that the channel selected/watched by the user is the channel CH2, and the electronic device 10 is in the initialization phase. In response to the electronic device 10 being in the initialization phase, the channels CH_1-CH_3 in the channel database CH_DB may be selected as multiple predetermined prediction channels (e.g., the candidate prediction channels CPCH_1-CPCH_3) and may be stored into the prediction database PR_DB, and the candidate prediction channels CPCH_1-CPCH_3 in the prediction database PR_DB are directly stored into the channel buffer CB. For the prediction probability of the candidate prediction channel CPCH_1, in response to the comparison result CR indicating that the program type of the candidate prediction channel CPCH_1 is the same as that of the channel CH2 selected/watched by the user (i.e., the factor A), the candidate prediction channel CPCH_1 is within the channel buffer CB (i.e., the factor B), and the user may change from the channel CH2 selected/watched by the user to the candidate prediction channel CPCH_1 by pressing the up button on the remote controller (i.e., the factor C), the prediction probability of the candidate prediction channel CPCH_1 may be 75% (25%+25%+25%). For the prediction probability of the candidate prediction channel CPCH_2, in response to the comparison result CR indicating that the program type of the candidate prediction channel CPCH_2 is the same as that of the channel CH2 selected/watched by the user (i.e., the factor A), and the candidate prediction channel CPCH_2 is within the channel buffer CB (i.e., the factor B), the prediction probability of the candidate prediction channel CPCH_2 may be 50% (25%+25%). For the prediction probability of the candidate prediction channel CPCH_3, in response to the comparison result CR indicating that the candidate prediction channel CPCH_3 is within the channel buffer CB (i.e., the factor B), and the user may change from the channel CH2 selected/watched by the user to the candidate prediction channel CPCH_3 by pressing the down button on the remote controller (i.e., the factor C), the prediction probability of the candidate prediction channel CPCH_3 may be 50% (25%+25%).

The user changes from the channel CH2 to the channel CH5 by pressing the number button "5" corresponding to the channel CH5 on the remote controller (i.e., the channel currently selected/watched by the user is the channel CH5) to enter a second round R2, and the residence time corresponding to the channel CH5 is less than 1 minute. For the second round R2, the processor 12 may further select the channel CH5 in the channel database CH_DB as the candidate prediction channel CPCH_5, and store the candidate prediction channel CPCH_5 into the prediction database PR_DB. At this moment, the prediction database PR_DB includes the candidate prediction channels CPCH_1-CPCH_3 and CPCH_5.

For the prediction probability of the candidate prediction channel CPCH_5, in response to the comparison result CR indicating that the user may change from the channel selected/watched by the user in the previous round (e.g., the channel CH2) to the candidate prediction channel CPCH_5 by pressing the number button on the remote controller (i.e., the factor C), the prediction probability of the candidate prediction channel CPCH_5 may be 25%. Under a condition that the user changes from the channel CH2 to the channel CH5 by pressing the number button on the remote controller, the candidate prediction channels CPCH_1-CPCH_3 may be regarded as prediction error channels in the prediction database PR_DB. The processor 12 may reduce the prediction probability of the candidate prediction channel CPCH_1 to 37.5% (75%*½), reduce the prediction probability of the candidate prediction channel CPCH_2 to 25% (50%*½), and reduce the prediction probability of the candidate prediction channel CPCH_3 to 25% (50%*½).

In response to the buffer slot B1-B3 of the channel buffer CB, the processor 12 may load/store the candidate prediction channels with the top three highest prediction probabilities in the prediction database PR_DB into the channel buffer CB. It should be noted that, when the channel currently selected/watched by the user (e.g., the channel CH5) is different from the candidate prediction channels last loaded into the prediction database PR_DB in the previous round (e.g., the candidate prediction channels CPCH_1, CPCH_2, and CPCH_3; i.e., the prediction fails), the processor 12 may prioritize loading the candidate prediction channel corresponding to the channel CH5 selected/watched by the user in the second round R2 (i.e., the candidate prediction channel CPCH_5) into the channel buffer CB. In addition, in the second round R2, the processor 12 may further load the candidate prediction channels with the top two highest prediction probabilities in the prediction database PR_DB (e.g., the candidate prediction channels CPCH_1 and CPCH_2) into the channel buffer CB.

The user changes from the channel CH5 to the channel CH6 by pressing the down button on the remote controller (i.e., the channel currently selected/watched by the user is the channel CH6) to enter a third round R3, and the residence time corresponding to the channel CH6 is less than 1 minute. For the third round R3, the processor 12 may further select the channels CH4 and CH6 in the channel database CH_DB as the candidate prediction channels CPCH_4 and CPCH_6, respectively, and store the candidate prediction channels CPCH_4 and CPCH_6 into the prediction database PR_DB. At this moment, the prediction database PR_DB includes candidate prediction channels CPCH_1-CPCH_6.

For the prediction probability of the candidate prediction channel CPCH_4, in response to the comparison result CR indicating that the user may change from the channel selected/watched by the user in the previous round (e.g., the channel CH5) to the candidate prediction channel CPCH_4 by pressing the up button on the remote controller (i.e., the factor C), the prediction probability of the candidate prediction channel CPCH_4 may be 25%.

For the prediction probability of the candidate prediction channel CPCH_5, in response to the comparison result CR indicating that the program type of the candidate prediction channel CPCH_5 is the same as that of the channel CH5 selected/watched by the user in the previous round (i.e., the factor A), and the candidate prediction channel CPCH_5 is within the channel buffer CB (i.e., the factor B), the prediction probability of the candidate prediction channel CPCH_5 may be 50% (25%+25%).

For the prediction probability of the candidate prediction channel CPCH_6, in response to the comparison result CR indicating that the program type of the candidate prediction channel CPCH_6 is the same as that of the channel CH5 selected/watched by the user in the previous round (i.e., the factor A), and that the user may change from the channel selected/watched by the user in the previous round (e.g., the channel CH5) to the candidate prediction channel CPCH_6 by pressing the down button on the remote controller (i.e., the factor C), the prediction probability of the candidate prediction channel CPCH_6 may be 50% (25%+25%).

In addition, the candidate prediction channels CPCH_1-CPCH_3 are still regarded as prediction error channels in the prediction database PR_DB. As a result, the processor 12 may continuously reduce the prediction probability of the candidate prediction channel CPCH_1 to 37.5% (75%*⅓), reduce the prediction probability of the candidate prediction channel CPCH_2 to 16.7% (50%*⅓), and reduce the prediction probability of the candidate prediction channel CPCH_3 to 16.7% (50%*⅓). Afterwards, the processor 12 may update the channel buffer CB to load the candidate prediction channels with the top three highest prediction probabilities in the prediction database PR_DB (i.e., the candidate prediction channels CPCH_4-CPCH_6) into the channel buffer CB.

The user changes from the channel CH6 to the channel CH7 by pressing the down button on the remote controller (i.e., the channel currently selected/watched by the user is the channel CH7) to enter a fourth round R4, and the residence time corresponding to the channel CH7 is greater than 10 minutes. For the fourth round R4, the processor 12 may further select the channel CH7 in the channel database CH_DB as the candidate prediction channel CPCH_7, and store the candidate prediction channel CPCH_7 into the prediction database PR_DB. At this moment, the prediction database PR_DB includes candidate prediction channels CPCH_1-CPCH_7.

For the prediction probability of the candidate prediction channel CPCH_5, in response to the comparison result CR indicating that the program type of the candidate prediction channel CPCH_5 is the same as that of the channel CH6 selected/watched by the user in the previous round (i.e., the factor A), the candidate prediction channel CPCH_5 being within the channel buffer CB (i.e., the factor B), and that the user may change from the channel selected/watched by the user in the previous round (e.g., the channel CH6) to the candidate prediction channel CPCH_5 by pressing the up button on the remote controller (i.e., the factor C), the prediction probability of the candidate prediction channel CPCH_5 may be 75% (25%+25%+25%).

For the prediction probability of the candidate prediction channel CPCH_6, in response to the comparison result CR indicating that the program type of the candidate prediction channel CPCH_6 is the same as that of the channel CH6 selected/watched by the user in the previous round (i.e., the factor A), and the candidate prediction channel CPCH_6 being within the channel buffer CB (i.e., the factor B), the prediction probability of the candidate prediction channel CPCH_6 may be 50% (25%+25%).

For the prediction probability of the candidate prediction channel CPCH_7, in response to the comparison result CR indicating that the user may change from the channel selected/watched by the user in the previous round (e.g., the channel CH6) to the candidate prediction channel CPCH_7 by pressing the down button on the remote controller (i.e., the factor C), the prediction probability of the candidate prediction channel CPCH_7 may be 25%.

In addition, the candidate prediction channels CPCH_1-CPCH_3 are still regarded as prediction error channels in the prediction database PR_DB. As a result, the processor 12 may continuously reduce the prediction probability of the candidate prediction channel CPCH_1 to 18.8% (75%*¼), reduce the prediction probability of the candidate prediction channel CPCH_2 to 12.5% (50%*¼), and reduce the prediction probability of the candidate prediction channel CPCH_3 to 12.5% (50%*¼). In addition, the candidate prediction channel CPCH_4 may be regarded as a prediction error channel in the prediction database PR_DB, and the processor 12 may reduce the prediction probability of the candidate prediction channel CPCH_4 to 12.5% (25%*½). Afterwards, the processor 12 may update the channel buffer CB by loading the candidate prediction channels with the top three highest prediction probabilities in the prediction database PR_DB (i.e., the candidate prediction channels CPCH_5-CPCH_7) into the channel buffer CB.

FIG. 8 is a diagram illustrating another example of the channel prediction method shown in FIG. 2 according to an embodiment of the present invention, wherein the example shown in FIG. 8 may be regarded as subsequent operations of the example shown in FIG. 7. The user changes from the channel CH7 to the channel CH8 by pressing the down button on the remote controller (i.e., the channel currently selected/watched by the user is the channel CH8) to enter a fifth round R5, and the residence time corresponding to the channel CH8 is greater than 5 minutes and is less than or equal to 10 minutes. For the fifth round R5, the processor 12 may further select the channel CH8 in the channel database CH_DB as the candidate prediction channel CPCH_8, and store the candidate prediction channel CPCH_8 into the prediction database PR_DB. At this moment, the prediction database PR_DB includes candidate prediction channels CPCH_1-CPCH_8.

For the prediction probability of the candidate prediction channel CPCH_6, in response to the comparison result CR indicating that the candidate prediction channel CPCH_6 is within the channel buffer CB (i.e., the factor B), and that the user may change from the channel selected/watched by the user in the previous round (e.g., the channel CH7) to the candidate prediction channel CPCH_6 by pressing the up button on the remote controller (i.e., the factor C), the prediction probability of the candidate prediction channel CPCH_6 may be 50% (25%+25%).

For the prediction probability of the candidate prediction channel CPCH_7, in response to the comparison result CR indicating that the program type of the candidate prediction channel CPCH_7 is the same as that of the channel CH7 selected/watched by the user in the previous round (i.e., the factor A), the candidate prediction channel CPCH_7 being within the channel buffer CB (i.e., the factor B), and the residence time corresponding to the candidate prediction channel CPCH_7 being greater than 10 minutes (i.e., the factor D), the prediction probability of the candidate prediction channel CPCH_7 may be 75% (25%+25%+25%).

For the prediction probability of the candidate prediction channel CPCH_8, in response to the comparison result CR indicating that the program type of the candidate prediction channel CPCH_8 is the same as that of the channel CH7 selected/watched by the user in the previous round (i.e., the factor A), and that the user may change from the channel selected/watched by the user in the previous round (e.g., the channel CH7) to the candidate prediction channel CPCH_8 by pressing the down button on the remote controller (i.e., the factor C), the prediction probability of the candidate prediction channel CPCH_8 may be 50% (25%+25%).

In addition, the candidate prediction channels CPCH_1-CPCH_4 are still regarded as prediction error channels in the prediction database PR_DB. As a result, the processor 12 may continuously reduce the prediction probability of the candidate prediction channel CPCH_1 to 15% (75%*⅕), reduce the prediction probability of the candidate prediction channel CPCH_2 to 10% (50%*⅕), reduce the prediction probability of the candidate prediction channel CPCH_3 to 10% (50%*⅕), and reduce the prediction probability of the candidate prediction channel CPCH_4 to 8.3% (25%*⅓). In addition, the candidate prediction channel CPCH_5 may be regarded as a prediction error channel in the prediction database PR_DB, and the processor 12 may reduce the prediction probability of the candidate prediction channel CPCH_5 to 37.5% (75%*½). Afterwards, the processor 12 may update the channel buffer CB by loading the candidate prediction channels with the top three highest prediction probabilities in the prediction database PR_DB (i.e., the candidate prediction channels CPCH_6-CPCH_8) into the channel buffer CB.

The user changes from the channel CH8 to the channel CH9 by pressing the down button on the remote controller (i.e., the channel currently selected/watched by the user is the channel CH9) to enter a sixth round R6, and the residence time corresponding to the channel CH9 is less than 1 minute. For the sixth round R6, the processor 12 may further select the channel CH9 in the channel database CH_DB as the candidate prediction channel CPCH_9, and store the candidate prediction channel CPCH_9 into the prediction database PR_DB. At this moment, the prediction database PR_DB includes candidate prediction channels CPCH_1-CPCH_9.

For the prediction probability of the candidate prediction channel CPCH_7, in response to the comparison result CR indicating that the program type of the candidate prediction channel CPCH_7 is the same as that of the channel CH8 selected/watched by the user in the previous round (i.e., the factor A), the candidate prediction channel CPCH_7 being within the channel buffer CB (i.e., the factor B), and that the user may change from the channel selected/watched by the user in the previous round (e.g., the channel CH8) to the candidate prediction channel CPCH_7 by pressing the up button on the remote controller (i.e., the factor C), the prediction probability of the candidate prediction channel CPCH_7 may be 75% (25%+25%+25%).

For the prediction probability of the candidate prediction channel CPCH_8, in response to the comparison result CR indicating that the program type of the candidate prediction channel CPCH_8 is the same as that of the channel CH8 selected/watched by the user in the previous round (i.e., the factor A), the candidate prediction channel CPCH_8 being within the channel buffer CB (i.e., the factor B), and residence time corresponding to the candidate prediction channel CPCH_8 being greater than 5 minutes and less than or equal to 10 minutes (i.e., the factor D), the prediction probability of the candidate prediction channel CPCH_8 may be 62.5% (25%+25%+12.5%).

For the prediction probability of the candidate prediction channel CPCH_9, in response to the comparison result CR indicating that the user may change from the channel selected/watched by the user in the previous round (e.g., the channel CH8) to the candidate prediction channel CPCH_9 by pressing the down button on the remote controller (i.e., the factor C), the prediction probability of the candidate prediction channel CPCH_9 may be 25%.

In addition, the candidate prediction channels CPCH_1-CPCH_5 are still regarded as prediction error channels in the prediction database PR_DB. As a result, the processor 12 may continuously reduce the prediction probability of the candidate prediction channel CPCH_1 to 12.5% (75%*⅙), reduce the prediction probability of the candidate prediction channel CPCH_2 to 8.3% (50%*⅙), reduce the prediction probability of the candidate prediction channel CPCH_3 to 8.3% (50%*⅙), reduce the prediction probability of the candidate prediction channel CPCH_4 to 6.25% (25%*¼), and reduce the prediction probability of the candidate prediction channel CPCH_5 to 25% (75%*⅓). In addition, the candidate prediction channel CPCH_6 may be regarded as a prediction error channel in the prediction database PR_DB, and the processor 12 may reduce the prediction probability of the candidate prediction channel CPCH_6 to 25% (50%*½). Afterwards, the processor 12 may update the channel buffer CB to load the candidate prediction channels with the top three highest prediction probabilities in the prediction database PR_DB into the channel buffer CB. It should be noted that, when there are multiple candidate prediction channels with the same prediction probability in the prediction database PR_DB (e.g., the candidate prediction channels CPCH_5, CPCH_6, and CPCH_9), the processor 12 may prioritize loading the candidate prediction channel corresponding to the channel CH9 selected/watched by the user in the sixth round R6 (i.e., the candidate prediction channel CPCH_9) into the channel buffer CB. In the sixth round R6, the candidate prediction channels with the top three highest prediction probabilities in the prediction database PR_DB (i.e., the candidate prediction channels CPCH_7, CPCH_8, and CPCH_9) are loaded into the channel buffer CB.

The user changes from the channel CH9 to the channel CH3 by pressing the number button "3" corresponding to the channel CH3 on the remote controller to enter a seventh round R7, and then the user turns off the power of the electronic device 10. For the seventh round R7, the processor 12 may further select the channel CH10 in the channel database CH_DB as the candidate prediction channel CPCH_10, and store the candidate prediction channel CPCH_10 into the prediction database PR_DB. At this moment, the prediction database PR_DB includes candidate prediction channels CPCH_1-CPCH_10.

For the prediction probability of the candidate prediction channel CPCH_9, in response to the comparison result CR indicating that the program type of the candidate prediction channel CPCH_9 is the same as that of the channel CH9 selected/watched by the user in the previous round (i.e., the factor A), and the candidate prediction channel CPCH_9 being within the channel buffer CB (i.e., the factor B), the prediction probability of the candidate prediction channel CPCH_9 may be 50% (25%+25%).

For the prediction probability of the candidate prediction channel CPCH_10, in response to the comparison result CR indicating that the program type of the candidate prediction channel CPCH_10 is the same as that of the channel CH9 selected/watched by the user in the previous round (i.e., the factor A), and that the user may change from the channel selected/watched by the user in the previous round (e.g., the channel CH9) to the candidate prediction channel CPCH_10 by pressing the down button on the remote controller (i.e., the factor C), the prediction probability of the candidate prediction channel CPCH_10 may be 50% (25%+25%).

For the prediction probability of the candidate prediction channel CPCH_3, in response to the comparison result CR indicating that the user may change from the channel selected/watched by the user in the previous round (e.g., the channel CH9) to the candidate prediction channel CPCH_3 by pressing the number button on the remote controller (i.e., the factor C), the prediction probability of the candidate prediction channel CPCH_3 may be 25%.

In addition, the candidate prediction channels CPCH_1-CPCH_2 and CPCH_4-CPCH_6 are still regarded as prediction error channels in the prediction database PR_DB. As a result, the processor 12 may continuously reduce the prediction probability of the candidate prediction channel CPCH_1 to 10.75% (75%*$\frac{1}{7}$), reduce the prediction probability of the candidate prediction channel CPCH_2 to 7.14% (50%*$\frac{1}{7}$), reduce the prediction probability of the candidate prediction channel CPCH_4 to 5% (25%*$\frac{1}{5}$), reduce the prediction probability of the candidate prediction channel CPCH_5 to 18.8% (75%*$\frac{1}{4}$), and reduce the prediction probability of the candidate prediction channel CPCH_6 to 12.5% (50%*$\frac{1}{4}$). In addition, the candidate prediction channels CPCH_7 and CPCH_8 may be regarded as prediction error channels in the prediction database PR_DB, and the processor 12 may reduce the prediction probability of the candidate prediction channel CPCH_7 to 37.5% (75%*$\frac{1}{2}$), and may reduce the prediction probability of the candidate prediction channel CPCH_8 to 31.25% (62.5%*$\frac{1}{2}$). It should be noted that, when the channel currently selected/watched by the user (e.g., the channel CH3) is different from the candidate prediction channels last loaded into the prediction database PR_DB in the previous round (e.g., the candidate prediction channels CPCH_7, CPCH_8, and CPCH_9; that is, the prediction fails), even if the updated prediction probability (25%) of the candidate prediction channel CPCH_3 corresponding to the channel CH3 is not one of the candidate prediction channels with the top three highest prediction probabilities in the prediction database PR_DB (i.e., the candidate prediction channels CPCH_7 (37.5%), CPCH_9 (50%), and CPCH_10 (50%)), the processor 12 may prioritize loading the candidate prediction channel corresponding to the channel CH3 selected/watched by the user in the seventh round R7 into the channel buffer CB. Afterwards, the processor 12 may update the channel buffer CB by loading the candidate prediction channels with the top two highest prediction probabilities in the prediction database PR_DB (i.e., the candidate prediction channels CPCH_9 and CPCH_10) into the channel buffer CB.

In summary, by the channel prediction method and the associated electronic device proposed by the present invention, a next channel to which a user desires to change (i.e., the prediction channels PCH_1-PCH_L) can be predicted, and program content of the prediction channels PCH_1-PCH_L can thereby be loaded in a memory in advance according to the prediction channels PCH_1-PCH_L in the channel buffer CB. In this way, the FCC can be sped up and the user experience can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel prediction method applied to channel change, comprising:
   selecting multiple candidate prediction channels from multiple channels in a channel database, and storing the multiple candidate prediction channels into a prediction database;
   comparing the multiple candidate prediction channels with a channel selected by a user to generate a comparison result; and
   selecting multiple prediction channels from the multiple candidate prediction channels in the prediction database according to the comparison result, and storing the multiple prediction channels into a channel buffer;
   wherein the channel buffer comprises a pre-prediction channel, a current prediction channel, and a post-prediction channel, and the step of selecting the multiple prediction channels from the multiple candidate prediction channels in the prediction database according to the comparison result, and storing the multiple prediction channels into the channel buffer comprises:
      in response to the comparison result indicating that the channel selected by the user is not one of the multiple prediction channels, utilizing the channel selected by the user, a previous channel of the channel selected by the user, and a next channel of the channel selected by the user to replace the pre-prediction channel, the current prediction channel, and the post-prediction channel in the channel buffer, respectively.

2. The channel prediction method of claim 1, wherein the step of selecting the multiple prediction channels from the multiple candidate prediction channels in the prediction database according to the comparison result, and storing the multiple prediction channels into the channel buffer comprises:
   in response to an initialization phase, directly storing multiple predetermined prediction channels in the prediction database into the channel buffer.

3. The channel prediction method of claim 1, wherein the step of selecting the multiple prediction channels from the multiple candidate prediction channels in the prediction database according to the comparison result, and storing the multiple prediction channels into the channel buffer comprises:

in response to the comparison result indicating that the channel selected by the user is the pre-prediction channel, exchanging a position of the pre-prediction channel and a position of the current prediction channel; and in response to the comparison result indicating that the channel selected by the user is the post-prediction channel, exchanging a position of the post-prediction channel and the position of the current prediction channel.

4. The channel prediction method of claim 1, wherein the step of selecting the multiple prediction channels from the multiple candidate prediction channels in the prediction database according to the comparison result, and storing the multiple prediction channels into the channel buffer further comprises:

in response to the comparison result indicating that the channel selected by the user is not the one of the multiple prediction channels, regarding multiple candidate prediction channels corresponding to the multiple prediction channels in the prediction database as multiple prediction error channels in the prediction database.

5. The channel prediction method of claim 4, wherein the step of regarding the multiple candidate prediction channels corresponding to the multiple prediction channels in the prediction database as the multiple prediction error channels in the prediction database comprises:

reducing multiple prediction probabilities of the multiple candidate prediction channels corresponding to the multiple prediction channels, respectively.

6. The channel prediction method of claim 1, wherein the step of selecting the multiple prediction channels from the multiple candidate prediction channels in the prediction database according to the comparison result, and storing the multiple prediction channels into the channel buffer comprises:

in response to the comparison result indicating that the channel selected by the user is not one of the multiple prediction channels, regarding a candidate prediction channel corresponding to the current prediction channel in the prediction database as a prediction error channel in the prediction database, and utilizing the channel selected by the user to replace the current prediction channel in the channel buffer.

7. The channel prediction method of claim 6, wherein the step of regarding the candidate prediction channel corresponding to the current prediction channel in the prediction database as the prediction error channel in the prediction database comprises:

reducing a prediction probability of the candidate prediction channel corresponding to the current prediction channel.

8. The channel prediction method of claim 1, wherein the step of selecting the multiple prediction channels from the multiple candidate prediction channels in the prediction database according to the comparison result, and storing the multiple prediction channels into the channel buffer comprises:

updating multiple prediction probabilities of the multiple candidate prediction channels according to the comparison result, to generate an updated result; and selecting the multiple prediction channels from the multiple candidate prediction channels in the prediction database according to the updated result, and storing the multiple prediction channels into the channel buffer.

9. The channel prediction method of claim 8, wherein the step of updating the multiple prediction probabilities of the multiple candidate prediction channels according to the comparison result comprises:

in response to the comparison result indicating that a program type of any candidate prediction channel among the multiple candidate prediction channels is equal to a program type of the channel selected by the user, increasing a prediction probability of the candidate prediction channel.

10. The channel prediction method of claim 8, wherein the step of updating the multiple prediction probabilities of the multiple candidate prediction channels according to the comparison result comprises:

in response to any candidate prediction channel among the multiple candidate prediction channels being within the channel buffer, increasing a prediction probability of the candidate prediction channel.

11. The channel prediction method of claim 8, wherein the step of updating the multiple prediction probabilities of the multiple candidate prediction channels according to the comparison result comprises:

in response to the user changing from the channel selected by the user to any candidate prediction channel among the multiple candidate prediction channels by pressing an up button, a down button, a number button, or a return button on a remote controller, increasing a prediction probability of the candidate prediction channel.

12. The channel prediction method of claim 8, wherein the step of updating the multiple prediction probabilities of the multiple candidate prediction channels according to the comparison result comprises:

in response to a residence time of any candidate prediction channel among the multiple candidate prediction channels being less than or equal to a predetermined time, not changing a prediction probability of the candidate prediction channel; and in response to the residence time of the candidate prediction channel among the multiple candidate prediction channels being greater than the predetermined time, increasing the prediction probability of the candidate prediction channel.

13. The channel prediction method of claim 1, further comprising:

after the multiple prediction channels are stored into the channel buffer, in response to a next channel selected by the user not being one of the multiple prediction channels in the channel buffer, storing a candidate prediction channel corresponding to the next channel selected by the user into the channel buffer.

14. An electronic device applied to channel change, comprising:

a processor, arranged to:

select multiple candidate prediction channels from multiple channels in a channel database, and store the multiple candidate prediction channels into a prediction database;

compare the multiple candidate prediction channels with a channel selected by a user to generate a comparison result; and select multiple prediction channels from the multiple candidate prediction channels in the prediction database according to the comparison result, and store the multiple prediction channels into a channel buffer;

wherein the channel buffer comprises a pre-prediction channel, a current prediction channel, and a post-prediction channel, and the processor is further arranged to:

in response to the comparison result indicating that the channel selected by the user is not one of the multiple prediction channels, utilize the channel selected by the user, a previous channel of the channel selected by the user, and a next channel of the channel selected by the user to replace the pre-prediction channel, the current prediction channel, and the post-prediction channel in the channel buffer, respectively.

15. The electronic device of claim 14, wherein the processor is further arranged to:

in response to an initialization phase, directly store multiple predetermined prediction channels in the prediction database into the channel buffer.

16. The electronic device of claim 14, wherein the processor is further arranged to:

in response to the comparison result indicating that the channel selected by the user is the pre-prediction channel, exchange a position of the pre-prediction channel and a position of the current prediction channel; and in response to the comparison result indicating that the channel selected by the user is the post-prediction channel, exchange a position of the post-prediction channel and the position of the current prediction channel.

17. The electronic device of claim 14, wherein the processor is further arranged to:

in response to the comparison result indicating that the channel selected by the user is not the one of the multiple prediction channels, regard multiple candidate prediction channels corresponding to the multiple prediction channels in the prediction database as multiple prediction error channels in the prediction database.

18. The electronic device of claim 17, wherein the processor is further arranged to:

reduce multiple prediction probabilities of the multiple candidate prediction channels corresponding to the multiple prediction channels, respectively.

* * * * *